US009086927B2

(12) United States Patent
Jullien et al.

(10) Patent No.: US 9,086,927 B2
(45) Date of Patent: Jul. 21, 2015

(54) METHOD AND SYSTEM FOR PROCESSING DATA FOR DATABASE MODIFICATION

(75) Inventors: René Jullien, Nice (FR); Vincent Moreau, Juan les Pins (FR); Muriel Becker, Grasse (FR)

(73) Assignee: Amadeus S.A.S., Sophia Antipolis (FR)

( * ) Notice: Subject to any disclaimer, the term of this patent is extended or adjusted under 35 U.S.C. 154(b) by 0 days.

(21) Appl. No.: 13/178,957

(22) Filed: Jul. 8, 2011

(65) Prior Publication Data
US 2013/0006955 A1 Jan. 3, 2013

(30) Foreign Application Priority Data

Jun. 28, 2011 (EP) .................................... 11305822

(51) Int. Cl.
G06F 9/46 (2006.01)
G06F 9/50 (2006.01)

(52) U.S. Cl.
CPC .................................. *G06F 9/5066* (2013.01)

(58) Field of Classification Search
CPC ................................................ G06F 17/30445
USPC ......................................... 707/706; 718/104
See application file for complete search history.

(56) References Cited

U.S. PATENT DOCUMENTS

| 5,832,182 | A | * | 11/1998 | Zhang et al. ..................... 706/50 |
| 6,021,405 | A | * | 2/2000 | Celis et al. ............................. 1/1 |
| 6,173,306 | B1 | | 1/2001 | Raz et al. |
| 6,449,619 | B1 | * | 9/2002 | Colliat et al. ................. 707/604 |
| 6,633,244 | B2 | * | 10/2003 | Avery et al. ..................... 341/60 |
| 7,089,260 | B2 | * | 8/2006 | Arnold et al. ......................... 1/1 |
| 7,174,381 | B2 | | 2/2007 | Gulko et al. |
| 7,225,444 | B1 | * | 5/2007 | Yung et al. .................... 718/106 |
| 7,281,013 | B2 | | 10/2007 | Chaudhuri et al. |
| 7,401,012 | B1 | | 7/2008 | Bonebakker et al. |
| 7,409,656 | B1 | | 8/2008 | Ruehl |
| 7,493,380 | B2 | | 2/2009 | Aman et al. |
| 7,512,591 | B2 | * | 3/2009 | Bildhaeuser et al. ................. 1/1 |
| 7,624,118 | B2 | * | 11/2009 | Schipunov et al. ................... 1/1 |
| 7,647,405 | B2 | | 1/2010 | Bivens et al. |
| 7,739,390 | B2 | * | 6/2010 | Brahmbhatt et al. ......... 709/227 |
| 7,937,705 | B1 | * | 5/2011 | Prael et al. .................... 718/102 |

(Continued)

OTHER PUBLICATIONS

European Search Report, dated Jan. 26, 2012, from corresponding European application.

(Continued)

*Primary Examiner* — Miranda Le
(74) *Attorney, Agent, or Firm* — Thompson Hine LLP

(57) ABSTRACT

A method and system for processing data for database modification, include receiving a set of data, performing a processing chain including a plurality of consecutive jobs to transform the set of data into transformed data, modifying a production database with respect to the transformed data and further include the steps of setting a target processing time for the performance of the consecutive jobs, before a launch of a first job, applying an original configuration as current configuration defining a parallelization level for each of the consecutive jobs, before a launch of at least one further job after the first job, upon an actual remaining processing time being out of a range of acceptable remaining processing times, applying an adapted configuration as new current configuration defining an adapted parallelization level for each of the jobs remaining in the processing chain, the adapted configuration differing from the current configuration.

30 Claims, 8 Drawing Sheets

(56) References Cited

U.S. PATENT DOCUMENTS

| | | | |
|---|---|---|---|
| 7,941,426 B2* | 5/2011 | Bestgen et al. | 707/718 |
| 7,953,891 B2* | 5/2011 | Blaszczak et al. | 709/246 |
| 8,032,867 B2* | 10/2011 | Bansal | 717/128 |
| 8,112,751 B2* | 2/2012 | Leijen et al. | 718/100 |
| 8,150,904 B2* | 4/2012 | Queck et al. | 709/201 |
| 8,185,912 B1* | 5/2012 | Leonard | 719/314 |
| 8,219,548 B2* | 7/2012 | Mizoe et al. | 707/721 |
| 8,225,300 B1* | 7/2012 | Webb et al. | 717/149 |
| 8,280,870 B2* | 10/2012 | Melet et al. | 707/706 |
| 8,281,309 B2* | 10/2012 | Meda et al. | 718/101 |
| 8,311,989 B1* | 11/2012 | Morris et al. | 707/648 |
| 8,352,956 B1* | 1/2013 | Kishore | 718/106 |
| 8,555,281 B1* | 10/2013 | van Dijk et al. | 718/100 |
| 2005/0125436 A1* | 6/2005 | Mudunuri et al. | 707/102 |
| 2005/0187974 A1* | 8/2005 | Gong | 707/104.1 |
| 2006/0074874 A1 | 4/2006 | Day et al. | |
| 2006/0085796 A1 | 4/2006 | Hoerle et al. | |
| 2007/0271547 A1* | 11/2007 | Gulko et al. | 717/106 |
| 2009/0051814 A1* | 2/2009 | Shirane et al. | 348/571 |
| 2009/0064167 A1* | 3/2009 | Arimilli et al. | 718/105 |
| 2009/0112792 A1* | 4/2009 | Barsness et al. | 707/2 |
| 2009/0177671 A1* | 7/2009 | Pellegrini et al. | 707/100 |
| 2009/0327214 A1* | 12/2009 | Richardson et al. | 707/2 |
| 2010/0095299 A1* | 4/2010 | Gupta et al. | 718/103 |
| 2010/0095303 A1 | 4/2010 | Archer et al. | |
| 2010/0100703 A1 | 4/2010 | Basu et al. | |
| 2010/0257533 A1* | 10/2010 | Dvir et al. | 718/103 |
| 2010/0318674 A1* | 12/2010 | Mond et al. | 709/234 |
| 2011/0061057 A1* | 3/2011 | Harris et al. | 718/104 |
| 2011/0145830 A1* | 6/2011 | Yamaguchi | 718/104 |
| 2012/0167101 A1* | 6/2012 | Kandula et al. | 718/102 |
| 2012/0278293 A1* | 11/2012 | Bulkowski et al. | 707/703 |

OTHER PUBLICATIONS

Waheed Ahmed et al., "Run-Time Resource Allocation for Simultaneous Multi-Tasking in Multi-Core Reconfigurable Processors", IEEE International Symposium on Field-Programmable Custom Computing Machines, May 1, 2011, pp. 29-32; Cited in European Search Report.

Alkis Simitsis et al., "QoX-Driven ETL Design: Reducing the Cost of ETL Consulting Engagements", Jul. 20, 2009, pp. 953-960, retrieved from the Internet: URL:http://www.dblab.ntua.gri/~asimi/publications/sigmod09-simitsis.pdf; Cited in Eurpean Search Report.

* cited by examiner

Product A

| Number of Data | Configuration | | | | |
|---|---|---|---|---|---|
| | Name | Job 9 | Job 10 | Job 11 | Job 12 | Number of Executions |
| From 0 to 9,999 | Config 1 | 1 | 1 | 1 | 1 | 10 |
| From 10,000 to 9,999 | Config 2 | 1 | 2 | 3 | 3 | 10 |
| From 100,000 to indef | Config 3 | 1 | 4 | 4 | 5 | 10 |

FIG. 6a

Product A

| Config | Type | Execution | Number of Data | Time spent (in ms) | | | |
|---|---|---|---|---|---|---|---|
| | | | | Job 9 | Job 10 | Job 11 | Job 12 |
| Config 2 | Standard | 1 | 10,000 | 900 | 1350 | 1900 | 2000 |
| | | 2 | 85,000 | 1500 | 2700 | 3250 | 3500 |
| | | ... | | ... | ... | ... | ... |

FIG. 6b

| Number of Data | Configuration | | | | | Number of Executions |
|---|---|---|---|---|---|---|
| | Name | Job 9 | Job 10 | Job 11 | Job 12 | |
| From 0 to 9,999 | Config 1 | 1 | 1 | 1 | 1 | 10 |
| From 10,000 to 99,999 | Config 2 | 1 | 2 | 3 | 3 | 11 |
| From 100,000 to indef | Config 3 | 1 | 4 | 4 | 5 | 10 |

| Product A | | | | Time spent (in ms) | | | |
|---|---|---|---|---|---|---|---|
| Config | Type | Execution | Number of Data | Job 9 | Job 10 | Job 11 | Job 12 |
| Config 2 | Standard | 1 | 10,000 | 900 | 1350 | 1900 | 2000 |
| | | 2 | 85,000 | 1500 | 2700 | 3250 | 3500 |
| | | ... | ... | ... | ... | ... | ... |
| | | 11 | 50,000 | 1200 | 2000 | 2500 | 2700 |

FIG. 6e

| | | Configuration | | | | Number of Executions |
|---|---|---|---|---|---|---|
| Number of Data | Name | Job 9 | Job 10 | Job 11 | Job 12 | |
| From 0 to 9,999 | Config 1 | 1 | 1 | 1 | 1 | 10 |
| From 10,000 to 99,999 | Config 2 | 1 | 2 | 3 | 3 | 11 |
| | Config 4 | 1 | 2 | 4 | 5 | 1 |
| From 100,000 to indef | Config 3 | 1 | 4 | 4 | 5 | 10 |

FIG. 6f

| Product A | | | | Time spent (in ms) | | | |
|---|---|---|---|---|---|---|---|
| Config | Type | Execution | Number of Data | Job 9 | Job 10 | Job 11 | Job 12 |
| Config 2 | Standard | 1 | 10,000 | 900 | 1350 | 1900 | 2000 |
| | | 2 | 85,000 | 1500 | 2700 | 3250 | 3500 |
| | | ... | ... | ... | ... | ... | ... |
| | | 11 | 50,000 | 1200 | 2000 | 2500 | 2700 |
| Config 4 | Exceptional | 1 | 50,000 | 2000 | 5000 | 3000 | 3100 |

FIG. 6g

| Number of Data | Configuration | | | | | Number of Executions |
|---|---|---|---|---|---|---|
| | Name | Job 9 | Job 10 | Job 11 | Job 12 | |
| From 0 to 9,999 | Config 1 | 1 | 1 | 1 | 1 | 10 |
| From 10,000 to 99,999 | Config 2 | 1 | 2 | 3 | 3 | 11 |
| | Config 4 | 1 | 2 | 4 | 5 | 2 |
| From 100,000 to indef | Config 3 | 1 | 4 | 4 | 5 | 10 |

FIG. 6h

| Product A | | | | Time spent (in ms) | | |
|---|---|---|---|---|---|---|
| Config | Type | Execution | Job 9 | Job 10 | Job 11 | Job 12 |
| Config 2 | Standard | 1 | 900 | 1350 | 1900 | 2000 |
| | | 2 | 1500 | 2700 | 3250 | 3500 |
| | | ... | ... | ... | ... | ... |
| | | 11 | 1200 | 2000 | 2500 | 2700 |
| Config 4 | Exceptional | 1 | 2000 | 5000 | 3000 | 3100 |
| | | 2 | 1950 | 4900 | 2900 | 3000 |

FIG. 6i

| Number of Data | Configuration | | | | | Number of Executions |
|---|---|---|---|---|---|---|
| | Name | Job 9 | Job 10 | Job 11 | Job 12 | |
| From 0 to 9,999 | Config 1 | 1 | 1 | 1 | 1 | 10 |
| From 10,000 to 99,999 | Config 2 | 1 | 2 | 3 | 3 | 11 |
| | Config 5 | 1 | 2 | 4 | 4 | 1 |
| | Config 4 | 1 | 2 | 4 | 5 | 2 |
| From 100,000 to indef | Config 3 | 1 | 4 | 4 | 5 | 10 |

METHOD AND SYSTEM FOR PROCESSING DATA FOR DATABASE MODIFICATION

TECHNICAL FIELD

The present invention relates to the field data processing in particular when large and variable volume of data needs to be transformed and loaded in databases.

BACKGROUND

Since they were introduced and started to be largely adopted in the 70's databases have proliferated in all sorts of domains including engineering, scientific, commercial and business applications. Their size can be anything ranging from a small database used by a single individual on a personal computer, e.g., to keep track of personal finances, to large and very large databases set up by various institutions, companies and commercial organizations to support their activity. In an all-interconnected world those large databases are also generally, if not always, made accessible to numerous remotely located end-users to query whatever information is made available by the databases.

In the airline industry, examples of such very-large databases are the ones that hold the airline fares along with the rules restricting their use. Fare databases are mainly set up by a few worldwide global distribution systems (GDSs) that provide travel services to actors of the travel industry including the traditional travel agencies and all sorts of other online travel service providers. Those large databases must generally be operational in a 24-hour-a-day/7-day-a-week mode to sustain a worldwide business that never sleeps while they also need to constantly acquire new fares published by hundreds of large and smaller airline companies. Huge volume of airfares data to be integrated into the database is received daily. The data received are variable and unpredictable in term of number of files, volume (from 0 to millions of records) and functional content (fares, rules, routings . . . ) and they are not filed the same way according to their provider.

The current trend is an increase both of the volume of each transmission and of the frequency. For instance ATPCo (which stands for Airline Tariff Publishing Company, a historical fare provider) have announced that they have sent hourly transmissions in 2010, instead of 10 times a day previously, more than doubling the frequency of their previous sending.

Fare definitions are usually made of several components comprising Fares (general data with fare amounts), Rules (which specify criteria applicable to the fares) and routings (typically ordered lists of intermediary cities through which a trip from an origin to a destination can be made).

New fare definitions are usually provided by the provider in the form of files which need to be processed by a computer system before a loading stage when the new fares, then stored in a database, are made available to a production system which is by way of example a portion of a computerized reservation system handling requests of end users such as travelers or travel agents in the perspective of returning information on travel solutions.

Current techniques for processing new fare definitions to be loaded in database involve fixed computer resources. Such resources are usually oversized to respect as often as possible a maximum processing time set up in a service level agreement (SLA) between the travel company (typically an airline) and the computer service provider (such as a GDS); but in case of peak period of fare filing, the SLA is even not fulfilled: an alert is then raised, requiring an immediate action.

Hence, there is a need for an improved technique for processing data to be loaded in database to optimize the resource consumption in every situation even when the volume of data to be processed varies in large proportions.

SUMMARY

At least some of the foregoing and other problems are overcome, and other advantages are realized, in accordance with the embodiments of this invention.

In one aspect thereof the exemplary embodiments provide a method and system for processing data for database modification, comprising: receiving a set of data, performing a processing chain comprising a plurality of consecutive jobs to transform the set of data into transformed data, modifying a production database with respect to the transformed data and further comprising the steps of setting a target processing time for the performance of the consecutive jobs, applying an original configuration as current configuration defining a parallelization level for each of the consecutive jobs, before a launch of at least one further job after the first job, upon an actual remaining processing time being out of a range of acceptable remaining processing times, applying an adapted configuration as new current configuration defining an adapted parallelization level for each of the jobs remaining in the processing chain, said adapted configuration differing from the current configuration.

An object of the invention is to take the required actions upon detection of a leeway of the processing chain.

In another aspect of the invention the exemplary embodiments provide a system for processing data for database modification, comprising means configured to execute the method. In another aspect the exemplary embodiments provide a computer program product stored in a non-transitory computer-readable memory medium and comprising instructions adapted to perform the method.

BRIEF DESCRIPTION OF THE DRAWINGS

The present invention will now be described in details with reference to the drawings for the purpose of illustrating the preferred embodiment.

FIG. 5 depicts another aspect of the invention where job dependencies are coped with.

FIGS. 6a through 6i are several tables illustrating a preferred embodiment for defining configurations for the parallelization levels of jobs.

DETAILED DESCRIPTION

Figure 1:
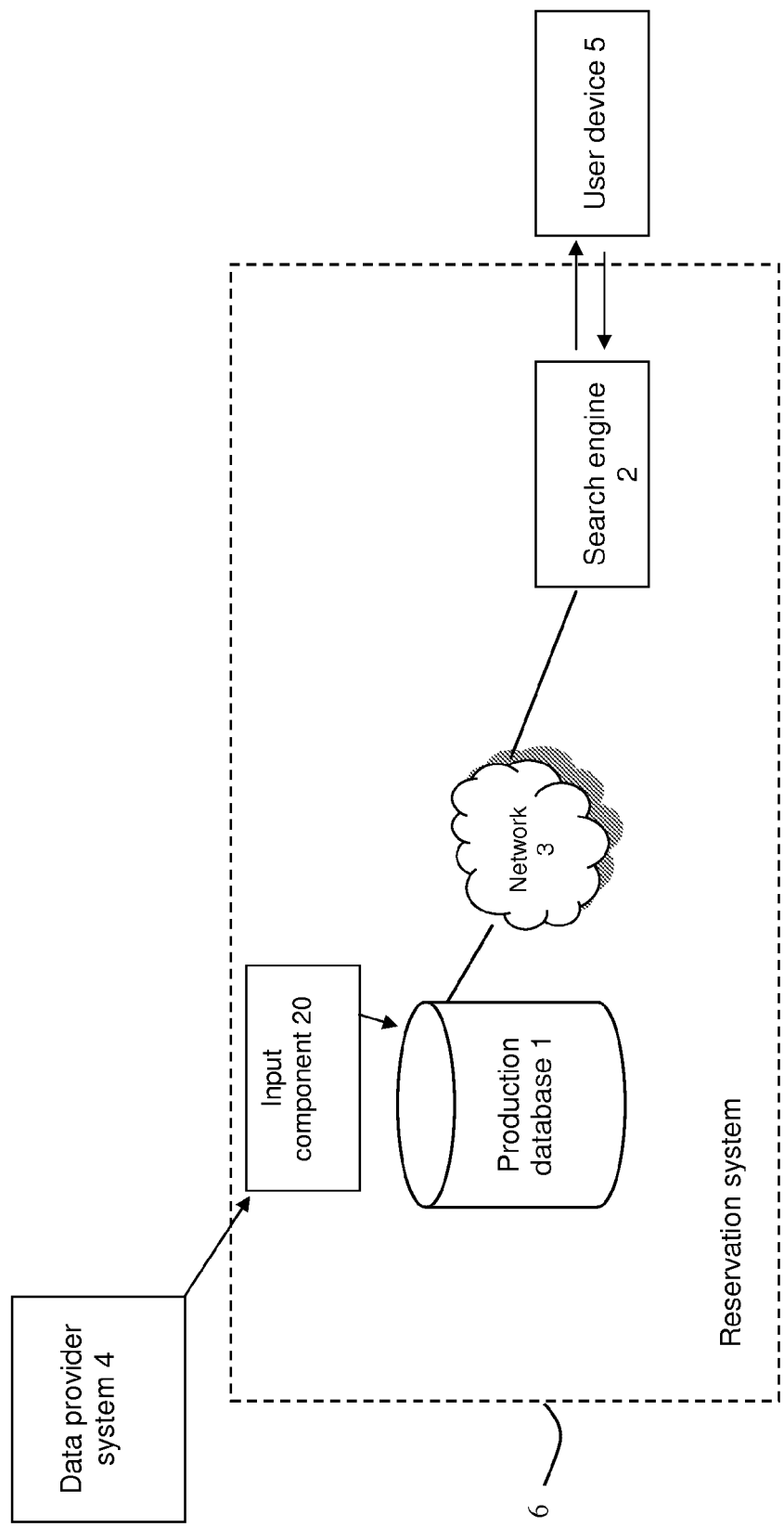
FIG. 1 shows a computerized architecture wherein the invention can be implemented in a preferred embodiment.

The invention can be implemented with computer hardware and software means. It can include a server side where the processing of data takes place. This server side—which may be comprised of single or plural computer devices—preferably communicates via network resources with at least one remote device such as but not exclusively a desktop computer of an administrator and/or a data provider device and/or any other user device.

A few term definitions are provided hereafter:

"job" here means a group of at least one step of data processing executed by computer means. For illustration purpose, a job can consist in or comprise format conversion, syntax checks, file extraction and table update with the data extracted from the files, . . . .

"a set of data" may be any group of data entities to be processed within a same processing chain. In the case of fare processing, each fare definition is typically split into several components here named data entities which can each non-exclusively be a fare or a fare rule or a routing. A fare corresponds to the general data of a fare definition including its name and monetary value(s). Fare rules are generally called records (record 1, record 2 . . . ) and are each dedicated to the specification of some criteria applicable to a fare (seasonality, traveler categories, special services . . . ). All the data of a new fare definition are usually not provided within a single file. Indeed several new fare definitions are often provided simultaneously and their data are spread over plural files each dedicated to one category or specific categories of data entities (categories such as record 1 or record 3 or fare . . . ). In such an application a "set of data" is typically a group of data entities of the same category received at the same time (generally in the same file) for plural fare definitions.

"processing chain" here means plural jobs which are executed consecutively for a given data entity; a processing chain will usually involve a set of data made of plural data entities. In such a case, the jobs are consecutive for at least one data entity but a job does not always need to be completed for all entities of the set of data before next job starts for at least some data entities, "non-transitory computer-readable memory medium" here means any storage means for storing program instructions and includes all kind of memories such as random access memory or read only memory or the like, "database" here comprises any data repository adapted to the storage and the retrieval of large volume of data; "production database" here means a database that is made accessible by a production facility such as a search engine aiming at replying to search requests of end user devices.

Some features corresponding to aspects of the invention according to preferred embodiments are hereafter introduced and will be described in detail later:

before a launch of all further jobs after the first job, upon an actual remaining processing time being out of a range of acceptable remaining processing times, applying an adapted configuration as new current configuration defining an adapted parallelization level for each of the jobs remaining in the processing chain, said adapted configuration differing from the current configuration;

the range of acceptable remaining processing times is preferably defined as a range of times under and/or over a determined proportion of the target processing time;

the original configuration and the adapted configuration are determined on the basis of information comprising historical data and constraint data;

the historical data comprise information on previous executions of processing chains for sets of data of a same type as the set of data;

the step of creating a configuration table comprises, for several ranges of data volume, a configuration definition section including at least one configuration definition specifying a number of parallel instances to be applied for each job;

upon the actual remaining processing time being under the range of acceptable remaining processing times, choosing the adapted processing configuration among at least one configuration of the configuration table for which the number of parallel instances to be applied to the remaining jobs is higher than the number of instances to be applied to the remaining jobs of the current configuration.

upon the actual remaining processing time being over the range of acceptable remaining processing times, choosing the adapted processing configuration among at least one configuration of the configuration table for which the number of parallel instances to be applied to the remaining jobs is lower than the number of instances to be applied to the remaining jobs of the current configuration.

It comprises performing the following steps:
receiving at least another set of data,
detecting at least one dependent job of a processing chain of the another set of data which depends from at least one given job of the processing chain of the set of data,
scheduling a launch of the dependent job after the completion of the one given job.
using a set of data including data entities each describing one component of a fare definition.
the component is selected among fare and fare rules and routings.
the processing chain comprises:
a first job of conversion of the set of data into a set of data converted in a format of an internal structure,
a second job of construction of at least one preliminary table based on the converted set of data,
a third job of update of a reference database based on the at least one preliminary table,
a fourth job of load of the update of the reference database into a production database.
the first job is using as input a file containing the set of data.
the fourth job is launched for at least one data entity for which the third job is completed even if the third job is not completed for all the data entities.
receiving a set of data for each of components of fare definitions and performing parallel processing chains for said components.

The method is preferably performed as a result of execution of computer software by at the least one data processor, the computer software being stored in a non-transitory computer-readable memory medium.

It can include sending the set of data from a provider system and it can comprise accessing data of the production database from an end user device via a search engine.

System advantageously includes a resource allocator comprising means for setting a target processing time for the performance of the consecutive jobs, before a launch of a first job, applying an original configuration as current configuration defining a parallelization level for each of the consecutive jobs, upon an actual remaining processing time being out of a range of acceptable remaining processing times, applying an adapted configuration as new current configuration defining an adapted parallelization level for each of the jobs remaining in the processing chain, said adapted configuration differing from the current configuration.

In some preferred cases, the system is such that:
a job scheduler has means for triggering the launch of the jobs.

the job scheduler comprises means for, upon receipt of at least another set of data, detecting at least one dependent job of a processing chain of the another set of data which depends from at least one given job of the processing chain of the set of data, and means for scheduling a launch of the dependent job after the completion of the one given job.

computer software are stored in a non-transitory computer-readable memory medium that is executed by at least one data processor that comprises part of the system.

In one embodiment of the invention, the application of an adapted configuration is triggered before launching at least one further job after the first job. However, it is preferred that the adaptation can potentially occur at any time during the processing chain. In particular, the parallelization level may be adapted via the application of an adapted configuration during the execution of a job. The adapted configuration then modifies the resource parameters of current job and next jobs. Current job and next jobs constitute the remaining jobs in this situation.

FIG. 1 shows an architecture wherein a production database 1 needs to be accessed. In application to the travel and tourism industry—which corresponds to the preferred embodiment described hereafter—the production database may store travel solutions data such as fare data which are used to determine fare amount(s) and conditions for travel recommendations made of at least one travel service which may non exclusively include: air travel segment, rail travel segment, car rental services, hotel room bookings or services related to the preceding examples. As far as air travel is concerned, a journey is typically determined by a system (generally a part of a computerized reservation system which can be implemented by a GDS) and a fare quote is triggered so as to assign a price to the journey with fare conditions. A travel solution (or a plurality of travel solutions) is returned to the requester and the travel solution comprises the description of the travel legs proposed for the journey as well as a price amount. The price amount is determined by application of a fare definition to the journey.

A fare definition includes several sections hereafter also equally called components or products:
  a fare section which principally gives the price of the journey;
  a rule section which provides the rules applicable to the fare definition. The rule section typically comprises several subsections named records as previously indicated.

Turning back to FIG. 1, the production database 1 may be a repository of such fare definitions. It is used, within a travel request process flow by a search engine 2 (such as a fare quote engine) upon request from an end user device 5 such as the computer device (including any types of devices such as smart phones, servers or personal computers) of a travel agent or a customer.

Transmission between the user device 5, the search engine 2 and the database 1 can be handled using conventional techniques such as over a network 3 as depicted in FIG. 1. Dashed lines show that the database 1 and the search engine 2 can be parts of a more global reservation system 6. FIG. 1 also illustrates that at least one provider system 4 needs to be taken into consideration for the management of the data contained in the database 1. It was previously explained that airfares are connected to perishable products sold by a very competitive industry.

It will now be further explain how the invention offers a flexible and efficient solution to modify the content of the production database 1 with respect to the provider's data modifications. All or some of the data modifications sent by the data provider system 4 can be processed by an input component 20 which is also preferably part of the reservation system 6 and which acts as an interface between the data provider system 4 and the production database 1 via any satisfying communication means.

The input data of component 20 are the new data the data provider system 4 wishes the production database takes into accounts. New data may include brand new fare definitions or modifications of existing fare definitions. Preferably data received at component 20 are in the form of at least one file. Each file contains at least a set of data. A set of data contains at least one data entity which describes one component (or product) of one fare definition. Empty files may also be received from a provider. In this case, all jobs related to the processing of this type of data are automatically set to 'Completed' in order to immediately resolve the dependencies other data may have on it. Preferably, each data provider system 4 sends separate files for components of the fare definitions and each file contains a plurality (and often large volumes) of data entities (i.e. one data entity per fare definition to be modified or created in the production database 1).

Figure 2:
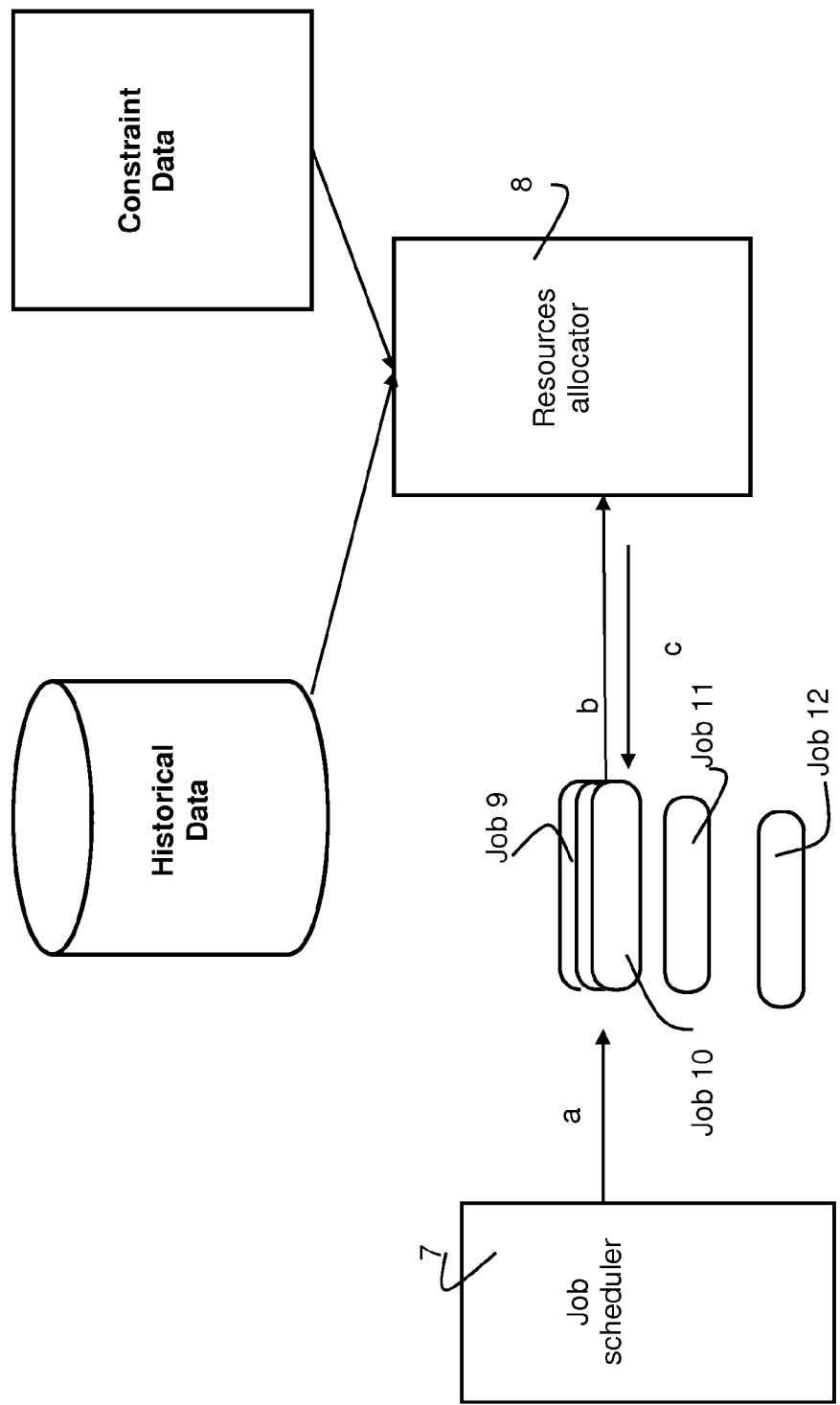
FIG. 2 shows one embodiment of steps for launching jobs and assigning computing resources to jobs.

Turning now to FIG. 2, an embodiment is shown where several jobs 9, 10, 11, 12 are executed to adapt the sets of data received from the provider to the format required by the production database 1. Another potential task of the jobs 9, 10, 11, 12 is to perform some checks as to the integrity and the syntax of the data.

Figure 3:
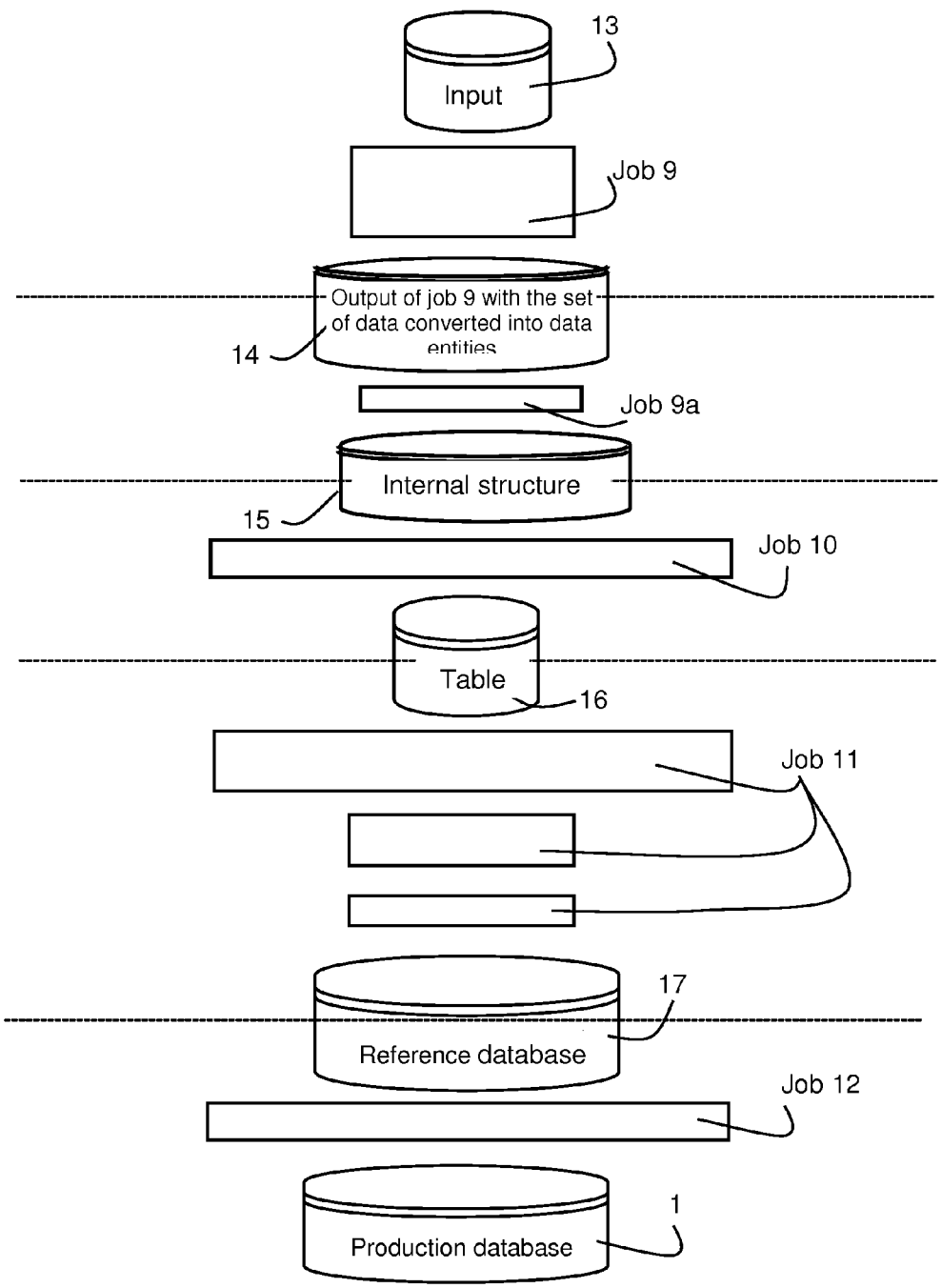
FIG. 3 shows one embodiment of a process flows which can be processed in some aspects of the invention.

A detailed example of jobs 9, 10, 11, 12 is given in FIG. 3 for a set of data made of data entities for one component of fare definitions. A file including at least one set of data is received in input 13. A first job 9 is there launched to perform an Edit/Convert step to control the transmitted file. This may include:
  a syntax check on all the fields, of the set of data. If a check fails, an error may be raised and the record may be rejected;
  a conversion of the records of the file into data entities corresponding to an internal data structure.
  this job may also filter the data to be handled by skipping useless records of the input file. A useless record is, for instance, a record in the past for which a discontinue data and an effective data are before the transmission data of the file.
  In case of a file containing sets of data for several components, job 9 splits the data so as to enable a separate processing of each component data.
  Icon 14 reflects the output of job 9 with the set of data converted into data entities.

An optional job 9a may sort the data to optimize their process. The sorting criteria are peculiar to the type of Set of Data. The role of this step is to sort the data in an order compatible with the parallelization of the next step (PreIntegration) and the Change Protocol to be applied. Indeed, for the parallelization to be efficient, there is a need to guarantee that the system is handling distinct data domains. Concerning the Change Protocol, the data must also be sorted in a given order for it to work properly. For instance, the Fares are sorted by Owner/Carrier/Tariff/Rule/Fareclass/Origin/Destination/ . . . . A refined internal structure 15 is then obtained.

Jobs 10 corresponds to a pre-integration step wherein the data are prepared before effective update in database. This allows to have a restart point for the integration in database. Also, additional actions can be taken such as when a fare references a new rule then this reference is checked at this step. This allows to guarantee the coherence of the Fare definition. The output of job 10 consists in at least one table 16 stored in a preliminary database. It should be noted that at this stage a high parallelism factor can be used since the further jobs take their input data in a database, said data being potentially processed interchangeably by any running parallel instance. On the contrary, jobs 9, 9a and 10 are handling files so that parallelizing each job implies to prior split the file.

Job 11 depicted in FIG. 3 is for data integration purposes. It can include:

data retrieval from database preliminary table 16.

application of change protocol specified by the data provider. This protocol describes how the Fare Definitions (new or updated) must be merged with the set of data already present in the database. This protocol describes how the Fare definitions must be changed in the database on the basis of the set of data.

performance of some checks such as cross control checks.

The data can then be updated in the form of a reference database 17.

Then job 12 loads the data in the production database 1 by creating an active image of the data of the reference table. It can also perform some additional actions such as denormalizing some rules information into fares.

The processing chain described above involves a processing time which can be managed thanks to the invention, taking into account the time lengths of the jobs, a target time and potential job dependencies within a processing chain and/or between parallel processing chains processing sets of data.

To do this, FIG. 2 shows some features which can include an input component 20. A first feature is a job scheduler 7 which control the launch of the jobs. It will be later described in detail why a job may not be executable because it needs data to be first processed by another job. The job scheduler 7 can launch a job upon all the dependencies are resolved for said job. This corresponds to the arrow "a" in FIG. 2, launching for instance job 10.

Before the job 10 effectively starts, a resources allocator 8 is called as shown with arrow "b". This call advantageously specifies the data volume involved for job 10, the kind of component (also called product) and the type of process to be done i.e. the nature of the job Edit/convert, preintegration, load . . . .

The resources allocator 8 then allocates the best resource level (computer processing units) which is linked to the number of parallel instances used for the given job. Preferably the allocation is done based on a target processing time for the processing chain. Thus, the resources allocator 8 can adapt the allocated resource to reach the time target in view of the processing time already spent for the previous jobs of the processing chain. To get an optimal reactivity of the system, the resources allocator 8 is advantageously called before each job of the processing chain. This is however not limiting the invention. For example, this may be done only for jobs 11 and 12.

Preferably, the resources allocator 8 uses:

historical data stored in a historical statistical database. For a given product and a type of process it contains information on the previous executions (e.g. processing time, data volume handled, parallelism factor used).

constraint data which can include parameters to be applied to the job such as:

Limits not to be exceeded (CPU physical limit, maximum processing time, maximum database workload . . . );

Targets to be reached (targeted CPU usage, targeted processing time, targeted processing time, targeted database workload . . . )

Default parallelism factors.

Each step of the processing logs information (volume, processing time) in the historical statistical database. They are used by the next step to know in advance the volume it will have to handle. This is valid for any of the step except the first one (job 9) which is the one logging the first data volume information for a given cycle.

When a given job calls the resources allocator 8 it gives its characteristics (data volume to handle, type of process, product). With this information, the resources allocator 8 determines how many instances of the job have to run in parallel based:

on the statistics of processing of the past executions of the same job for more or less the same volume.

on the Constraints/Parameters on the statistics of processing of the previous steps of the current processing chain: accelerate if needed the remaining steps of processing (by increasing the parallelism factor) to keep up the delay that may have occurred for any reason during the previous steps.

As the range of volume is wide, it is virtually impossible to find two transmissions of the same product with the same data volume. Consequently the volume range is split into slices/packs on which resources allocator 8 computes the statistics.

The result/benefit of the invention is a guaranteed and fixed processing time whatever the type of data to process, their provider, their volume . . . , taking into account the available resources.

The computations of the resources allocator 8 lead to the delivery of a configuration adapted to the current situation of the processing chain and specifying the parallelism factor to be used by the job to be launched. This configuration transmission is depicted with arrow "c" in FIG. 2. The configuration may include parallelism factors (preferably in the form of number of instances) for other jobs.

FIGS. 6a to 6i give a concrete example of configuration determination.

FIG. 6a shows that for a given type of data (product A) several pre-determined configurations are stored respectively config. 1, config. 2, config. 3 each applicable to a range of numbers of data. Each configuration specifies the number of instances to be used for each job and the number of previous executions of the configuration.

FIG. 6b illustrates the statistics the system holds for a given configuration, in term of data volume and processing time in each job.

In the example of FIG. 6c, a set of data containing 50 000 data is received in input. Configuration Config. 2 is selected and an execution is added to enrich the historical database with this entry, assuming that the target time of this processing chain is fulfilled.

In the alternative case of FIG. 6e 50 000 data needed to be processed using config. 2. When running job 10 (at a stage when 85% of the data were processed), it appeared that 80% of the target processing time has passed; a leeway is detected and the resources allocator 8 modifies the configuration to be applied from the next job 11.

The resources allocator 8 determines that there was no exceptional case in the past and determines a new configuration named Config. 4 by applying the parallelism level of the upper configuration (config. 3) for the remaining jobs (jobs 11 and 12).

The newly created Config. 4 is now the current configuration for the processing chain and is also stored for later use (see FIG. 6f).

A further example is given in FIG. 6g where 45 000 data are received in the input set of data. The configuration Config. 2 is selected. As in the case of FIG. 6e, when running job 10 (already 90% of the data processed) it appears that 80% of the target processing time has passed. Again a leeway is detected and the resources allocator 8 changes the configuration.

Since a previous exceptional but similar case already occurred, con*fig.* 4 is selected. The historical database is updated accordingly (FIGS. 6g and 6h).

If the system detects that con*fig.* 2 is no more appropriate as standard configuration, the resources allocator 8 determines a new standard configuration such as con*fig.* 5 in FIG. 6i, with an adapted resource allocation for each job.

Preferably, a leeway is detected when the time spent in the process hits 80% (this may be parameterized) of the target processing time.

The resources allocator 8 does not necessarily change the configuration to handle a detected leeway.

By way of example, in order to preserve the KOPI (Key Operational Performance Indicator), the system may only need to have more than 90% (the value depends on the KOPI) of the transmissions processed in the time specified in the target time (this target time aiming at respecting a service level agreement). This means that it is not necessary to push all resources to rectify all leeways as long as long as the on-going leeway does not make us go under the 90% of transmissions processed in the target time. In the case where the target time is still respected, the resources allocator 8 does not modify the configuration.

But in the case where the target time is threatened, then the resources allocator 8 establishes a new configuration.

Case 1: Such an exceptional case already happened in the past (leeway detected at the same step for similar reasons, number of data equivalent
→Take the corresponding configuration
Case 2: No such exceptional case in the past.
→A new configuration must be determined.

By default, the upper configuration (that is, the configuration handling more data) is applied. If there is no such configuration, then a linear approach is used: multiply the number of resources based on a given factor f computed as follows:

$T_{std}$=Average time to handle 1 data in standard configuration (during the step at which the leeway has been detected).
$T_{exc}$=Average time to handle 1 data (during the step at which the leeway has been detected)

$$f=T_{exc}/T_{std}$$

if the on-going jobs are close to completion (≥80%)→apply the new configuration from the next step in the flow.
If the on-going jobs are not close to completion (<80%)→apply the new configuration from the current step in the flow.

Figure 4:
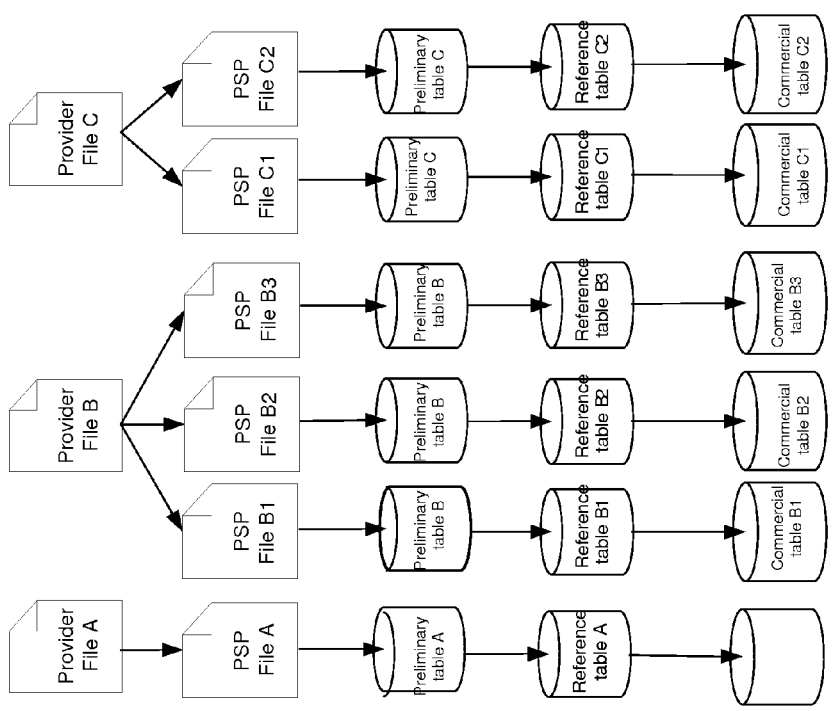
FIG. 4 is a schematic of parallel flows which can be processed in some embodiments of the invention.

FIG. 4 shows another aspect of the invention wherein several provider files are received in input. A provider file A leads to a first processing chain. In parallel processing chains provider files B and C are also executed. In the case of provider file B, the original file is split into 3 "PSP" files $B_1$, $B_2$, $B_3$ because it was containing data for three components or products of fare definitions. Similarly, provider file C is split into two "PSP" files $C_1$, $C_2$. The term PSP here corresponds to a preferred internal structure for working on the sets of data.

Figure 5:
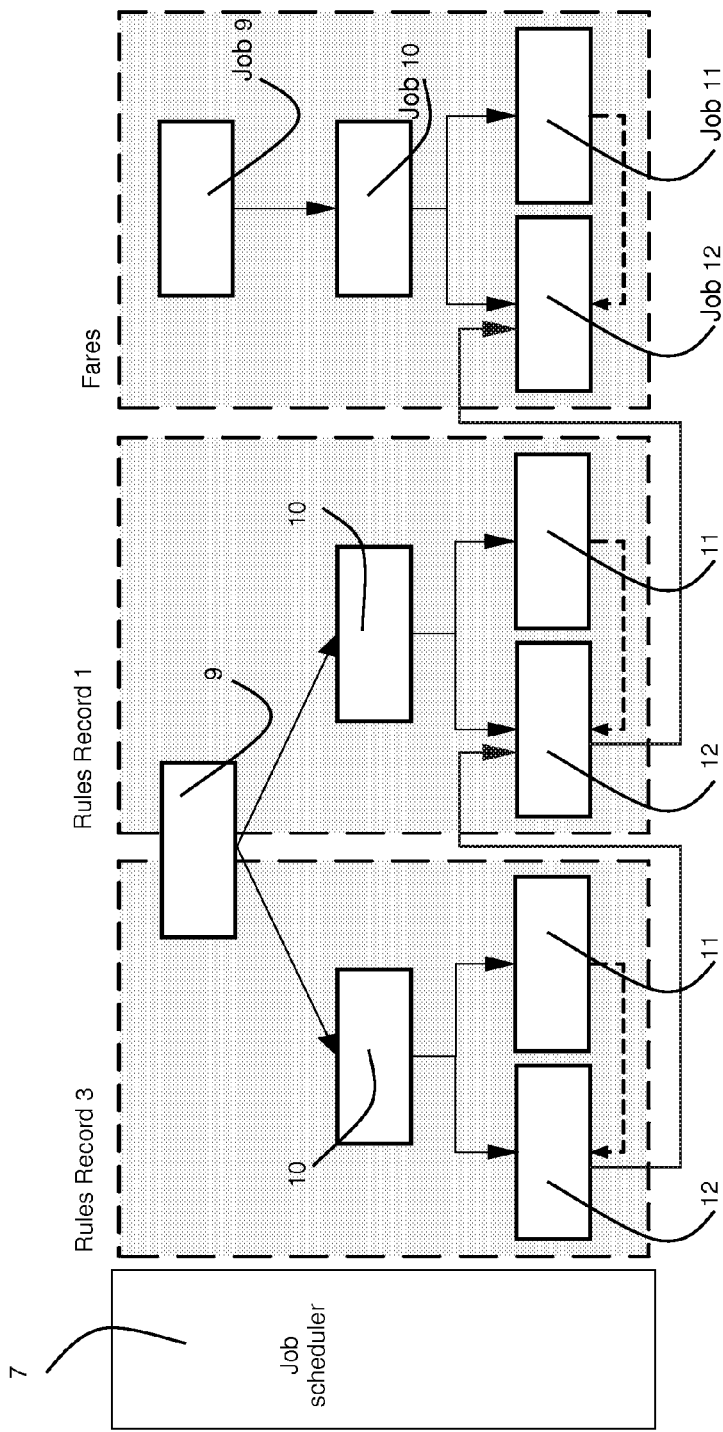

Ideally, the parallel process chains are executed independently. However, it may happen that some jobs of one given process chain depend on jobs of at least another process chains. This situation is illustrated in FIG. 5 where, by way of example, three parallel processing chains are visible. One chain is for a set of data corresponding to Rules record 3, another for Rules record 1 and another one for fares. Jobs 11 and 12 here depicted are substantially parallel jobs because there is no need to wait for the full completion of job 11 (for all data entities) to start job 12 for some data entities. However, the dashed lines clearly show that job 12 cannot end before job 11.

And, for depending reasons, job 12 of Rule record 1 processing chain cannot start before job 12 for rules record 3 is completed. The same applies between the job 12 of rules records 1 and job 12 of Fares.

To handle such intra and inter product dependencies, the job scheduler 7 acts as a tracker of the job executions to determine which job can be launched depending on the status of all processing chains.

Obviously, the example given above for fares used in the travel and tourism industry may have a similar application for other data types. The invention applies to all kind of process flow where processing time and CPU use are to be optimized. One advantage of the invention resides in that the process chain comprises several jobs which constitute advantageous resource allocation stages.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

What is claimed is:

1. A method for processing data for database modification, the method comprising:
receiving a first set of data;
performing a processing chain comprising a plurality of consecutive jobs to transform the first set of data into transformed data;
modifying a database with respect to the transformed data;
setting a target processing time for performance of the consecutive jobs;
before the consecutive jobs are launched, applying a first configuration defining a first number of parallel instances for each of the consecutive jobs; and
if an actual remaining processing time for the consecutive jobs uncompleted in the processing chain is outside of a range of acceptable remaining processing times relative to the target processing time, applying a second configuration defining a second number of parallel instances for each of the consecutive jobs uncompleted in the processing chain and including the first number of parallel instances for each of the consecutive jobs completed in the processing chain, the second number of parallel instances in the second configuration for at least one of the consecutive jobs uncompleted in the processing chain differing from the first number of parallel instances in the first configuration,
wherein the first configuration and the second configuration are determined based upon information comprising historical data and constraint data, and the historical data comprises information on previous executions of processing chains for sets of data of a same type as the first set of data.

2. The method of claim 1 wherein the range of acceptable remaining processing times is defined as a range of times under a determined proportion of the target processing time.

3. The method of claim 1 comprising:
creating a configuration table comprising, for several ranges of data volume, a configuration definition section including a plurality of configurations each specifying a number of parallel instances to be applied for each job, wherein the first configuration is among the plurality of configurations.

4. The method of claim 3 further comprising:
storing the second configuration in the configuration table.

5. The method of claim 1 wherein the second configuration is applied if the actual remaining processing time is under the range of acceptable remaining processing times, and the second number of parallel instances to be applied to the remaining jobs is higher than the first number of parallel instances to be applied to the remaining jobs.

6. The method of claim 1 wherein the second configuration is applied if the actual remaining processing time is over the range of acceptable remaining processing times, and the second number of parallel instances to be applied to the remaining jobs is lower than the first number of parallel instances to be applied to the remaining jobs.

7. The method of claim 1, wherein the first set of data comprises data entities, each data entity describing a component of a fare definition of a travel product.

8. The method of claim 7 wherein the component is a fare, a fare rules, or a routing.

9. The method of claim 7 wherein the processing chain comprises:
a first job of conversion of the first set of data into a first set of data converted in a format of an internal structure,
a second job of construction of at least one preliminary table based on the converted first set of data,
a third job of update of a reference database based on the at least one preliminary table, and
a fourth job of load of the update of the reference database into a production database.

10. The method of claim 9 wherein the first job is using as input a file containing the first set of data.

11. The method of claim 9 wherein the fourth job is launched for at least one data entity for which the third job is completed even if the third job is not completed for all the data entities.

12. The method of claim 9 comprising:
receiving the first set of data for each of the data entities of components of fare definitions; and
performing parallel processing chains for said components the data entities.

13. The method of claim 1 comprising:
sending the first set of data from a provider system.

14. The method of claim 1 comprising:
accessing data of the production database from an end user device via a search engine.

15. The method of claim 1 further comprising:
upon receipt of a second set of data, detecting a dependent job of a processing chain of the second set of data that requires input data relying on results generated by a given job of the processing chain of the first set of data; and
scheduling a launch of the dependent job after the completion of the given job.

16. The method of claim 1 wherein applying the first configuration defining the first number of parallel instances for each of the consecutive jobs comprises:
selecting the first configuration based upon the data in the set numbering between a minimum and a maximum.

17. The method of claim 16 wherein the second number of parallel instances for each of the consecutive jobs uncompleted in the processing chain is obtained from a third configuration that is applied if the data in the first set number is greater than the maximum.

18. The method of claim 16 wherein the second number of parallel instances for each of the consecutive jobs uncompleted in the processing chain is obtained from a third configuration that is applied if the data in the first set number is less than the minimum.

19. A system comprising:
at least one data processor; and program code configured upon execution by the at least one processor to process data for database modification by:
receiving a first set of data;
performing a processing chain comprising a plurality of consecutive jobs to transform the first set of data into transformed data;
modifying a database with respect to the transformed data;
setting a target processing time for performance of the consecutive jobs;
before the consecutive jobs are launched, applying a first configuration defining a first number of parallel instances for each of the consecutive jobs; and
if an actual remaining processing time for the consecutive jobs uncompleted in the processing chain is outside of a range of acceptable remaining processing times relative to the target processing time, applying a second configuration defining a second number of parallel instances for each of the consecutive jobs uncompleted in the processing chain and including the first number of parallel instances for each of the consecutive jobs completed in the processing chain, the second number of parallel instances in the second configuration for at least one of the consecutive jobs uncompleted in the processing chain differing from the first number of parallel instances in the first configuration,
wherein the first configuration and the second configuration are determined based upon information comprising historical data and constraint data, and the historical data comprises information on previous executions of processing chains for sets of data of a same type as the first set of data.

20. The system of claim 19, wherein at least one of the first and second sets of data comprise data entities, each data entity describing a component of a fare definition of a travel product.

21. The system of claim 19 wherein the program code configured upon execution by the at least one processor to process data for database modification by:
upon receipt of a second set of data, detecting a dependent job of a processing chain of the second set of data that requires input data relying on results generated by a given job of the processing chain of the first set of data; and
scheduling a launch of the dependent job after the completion of the given job.

22. The system of claim 19 wherein the program code configured upon execution by the at least one processor to process data for database modification by applying the first configuration defining the first number of parallel instances for each of the consecutive jobs comprises:
program code configured upon execution by the at least one processor to process data for database modification by selecting the first configuration based upon the data in the set numbering between a minimum and a maximum.

23. The system of claim 22 wherein the second number of parallel instances for each of the consecutive jobs uncompleted in the processing chain is obtained from a third configuration that is applied if the data in the first set number is greater than the maximum.

24. The system of claim 22 wherein the second number of parallel instances for each of the consecutive jobs uncompleted in the processing chain is obtained from a third configuration that is applied if the data in the first set number is less than the minimum.

25. A computer program product comprising:
a non-transitory computer-readable storage medium; and
a computer program stored on the storage medium, the computer program comprising instructions that, when executed on a computer, cause the computer to process data for database modification by:
receiving a first set of data;
performing a processing chain comprising a plurality of consecutive jobs to transform the first set of data into transformed data;
modifying a database with respect to the transformed data;
setting a target processing time for performance of the consecutive jobs;
before the consecutive jobs are launched, applying a first configuration defining a first number of parallel instances for each of the consecutive jobs; and
if an actual remaining processing time for the consecutive jobs uncompleted in the processing chain is outside of a range of acceptable remaining processing times relative to the target processing time, applying a second configuration defining a second number of parallel instances for each of the consecutive jobs uncompleted in the processing chain and including the first number of parallel instances for each of the consecutive jobs completed in the processing chain, the second number of parallel instances in the second configuration for at least one of the consecutive jobs uncompleted in the processing chain differing from the first number of parallel instances in the first configuration,
wherein the first configuration and the second configuration are determined based upon information comprising historical data and constraint data, and the historical data comprises information on previous executions of processing chains for sets of data of a same type as the first set of data.

26. The computer program product of claim 25, wherein at least one of the first and second sets of data comprise data entities, each data entity describing a component of a fare definition of a travel product.

27. The computer program product of claim 25 wherein the instructions that, when executed on the computer, further cause the computer to process data for database modification by:
upon receipt of a second set of data, detecting a dependent job of a processing chain of the second set of data that requires input data relying on results generated by a given job of the processing chain of the first set of data; and
scheduling a launch of the dependent job after the completion of the given job.

28. The computer program product of claim 25 wherein the instructions that, when executed on the computer, cause the computer to process data for database modification by applying the first configuration defining the first number of parallel instances for each of the consecutive jobs comprises:
instructions configured upon execution by the at least one processor to process data for database modification by selecting the first configuration based upon the data in the set numbering between a minimum and a maximum.

29. The computer program product of claim 28 wherein the second number of parallel instances for each of the consecutive jobs uncompleted in the processing chain is obtained from a third configuration that is applied if the data in the first set number is greater than the maximum.

30. The computer program product of claim 28 wherein the second number of parallel instances for each of the consecutive jobs uncompleted in the processing chain is obtained from a third configuration that is applied if the data in the first set number is less than the minimum.

* * * * *